United States Patent
Onorato et al.

(10) Patent No.: US 8,051,189 B2
(45) Date of Patent: Nov. 1, 2011

(54) METHODS, SYSTEMS, AND COMPUTER PROGRAM PRODUCTS FOR SESSION INITIATION PROTOCOL (SIP) FAST SWITCHOVER

(75) Inventors: Richard A. Onorato, The Colony, TX (US); Phil Chiu, Plano, TX (US)

(73) Assignee: Genband US LLC, Plano, TX (US)

( * ) Notice: Subject to any disclaimer, the term of this patent is extended or adjusted under 35 U.S.C. 154(b) by 1427 days.

(21) Appl. No.: 11/282,970

(22) Filed: Nov. 18, 2005

(65) Prior Publication Data

US 2007/0115806 A1 May 24, 2007

(51) Int. Cl.
*G06F 15/16* (2006.01)
(52) U.S. Cl. ........................................ 709/230
(58) Field of Classification Search .................... 709/230
See application file for complete search history.

(56) References Cited

U.S. PATENT DOCUMENTS

| | | |
|---|---|---|
| 6,847,991 B1 | 1/2005 | Kurapati |
| 6,876,646 B1 | 4/2005 | Dore et al. |
| 2002/0184376 A1 | 12/2002 | Sternagle |
| 2006/0153064 A1 * | 7/2006 | Caballero-McCann et al. ........................ 370/216 |

OTHER PUBLICATIONS

Notification of Transmittal of the International Search Report and the Written Opinion of the International Searching Authority, or the Declaration for International Application No. PCT/US06/41073 (Jun. 1, 2007).
Roach, "Session Initiation Protocol (SIP)—Specific Event Notification," Network Working Group, RFC 3265, pp. 1-34 (Jun. 2002).
Rosenberg et al., "SIP: Session Initiation Protocol," Network Working Group, RFC 3261 (Jun. 2002).
Chinese Official Action for Chinese Patent Application No. 200680051298.2 (Dec. 3, 2010).

* cited by examiner

*Primary Examiner* — Jeffrey Pwu
*Assistant Examiner* — Shripal Khajuria
(74) *Attorney, Agent, or Firm* — Jenkins, Wilson, Taylor & Hunt, P.A.

(57) ABSTRACT

Disclosed are methods, systems, and computer program products for notifying a Session Initiation Protocol (SIP) entity of a fast switchover event. According to one method a first SIP entity having an active host and a standby host is provided. At the active host a SUBSCRIBE message is received from a second SIP entity for subscribing to a fast switchover notification service. The standby host is switched to an active mode. In response to switching the standby host to active mode, a NOTIFY message is sent to the second SIP entity for notifying the second SIP entity that the standby host is operating in active mode.

34 Claims, 6 Drawing Sheets

METHODS, SYSTEMS, AND COMPUTER PROGRAM PRODUCTS FOR SESSION INITIATION PROTOCOL (SIP) FAST SWITCHOVER

TECHNICAL FIELD

The subject matter described herein relates to session initiation protocol (SIP) service in a communications network. More particularly, the subject matter described herein relates to methods, systems, and computer program products for a subscription-based SIP fast switchover.

BACKGROUND ART

Telecommunications systems have historically provided redundant load carrying capacity by maintaining multiple units at certain points within the network system. These multiple units have often been configured such that one unit operates as an active unit and the second unit operates as an active standby unit. The active unit and the active standby unit (hereinafter, standby unit) have traditionally been provisioned identically. The active unit traditionally carries the primary load and the standby unit becomes available to carry the load in the event the active unit fails or is taken off line for any reason.

The transition of the load from the active unit to the standby unit has historically created many problems with a loss of active calls. There is also a large amount of overhead associated with a load switch from the active to the standby unit. This overhead is in the form of inter-unit and intra-system messaging and communication. In order to minimize the impact of a load transition, the active unit periodically forwards updates of primary active load information to the standby unit. In this way, the standby unit is maintained in a ready state, prepared to carry the load of the active unit at any moment with minimal load loss.

For example, as shown in FIG. 1, a telecommunications subsystem 100 is shown. Within telecommunications subsystem 100 is a SIP entity 101 having an active SIP host 102 and standby SIP host 104. Active SIP host 102 and standby SIP host 104 are connected to each other through Internet protocol (IP) network 106. Also connected to IP network 106 are media gateway/media gateway controller (MG/MGC) 108 and MG/MGC 110.

Each MG/MGC 108 and MG/MGC 110 may maintain state information for SIP dialogs for calls in progress or being initiated to or from subscriber terminals 112 and 114 that are connected to each MG/MGC. According to IETF RFC 3261, a SIP dialog represents a peer-to-peer SIP relationship between two user agents that persists for some time. The dialog facilitates sequencing of messages between the user agents and proper routing of requests between both of them. The dialog represents a context in which to interpret SIP messages. Since each MG/MGC may maintain many dialogs, for example, thousands or tens of thousands of dialogs, switching from an active host to a standby host may require multiple messages to be sent to peer SIP entities.

In one implementation, if active SIP host 102 were to fail and standby SIP host 104 were to attempt to transition the load from active SIP host 102, the following message sequence for each dialog maintained by each SIP peer would be required. In order for each dialog maintained by MG/MGC 108 to have the proper IP address of the standby SIP host 104 associated with it, the standby SIP host 104 would need to send an INVITE message 116 to MG/MGC 108 for each dialog associated between MG/MGC 108 and active SIP host 102. For each INVITE message, MG/MGC 108 would send a 200 OK message 118 to standby SIP host 104. Standby SIP host 104 would then respond with an acknowledgement (ACK) message 120 for each SIP dialog.

As discussed above, each MGC may maintain thousands of dialogs. With the above described message sequence of INVITE message 116, 200 OK message 118 and ACK message 120, this correlates to thousands of messages for each MGC for every switchover event from active SIP host 102 to standby host 104. This overhead may result in lost calls due to the time required to send this many messages while attempting to transition all of the dialogs to the IP address of the new standby SIP host 104.

Accordingly, in light of these difficulties and performance problems associated with transitioning between active and standby SIP hosts, there exists a need for improved methods, systems, and computer program products for managing a switchover event.

SUMMARY

According to one aspect, the subject matter described herein comprises methods, systems, and computer program products for notifying a Session Initiation Protocol (SIP) entity of a fast switchover event. One method includes providing a first SIP entity having an active host and a standby host, receiving at the active host a SUBSCRIBE message from a second SIP entity for subscribing to a fast switchover notification service, switching the standby host to an active mode, and in response to switching the standby host to active mode, sending a NOTIFY message to the second SIP entity for notifying the second SIP entity that the standby host is operating in active mode.

The subject matter described herein providing SIP fast switchover may be implemented using a computer program product comprising computer executable instructions embodied in a computer readable medium. Exemplary computer readable media suitable for implementing the subject matter described herein includes disk memory devices, programmable logic devices, and application specific integrated circuits. In addition, a computer readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings, of which.

DETAILED DESCRIPTION OF THE INVENTION

Figure 1:
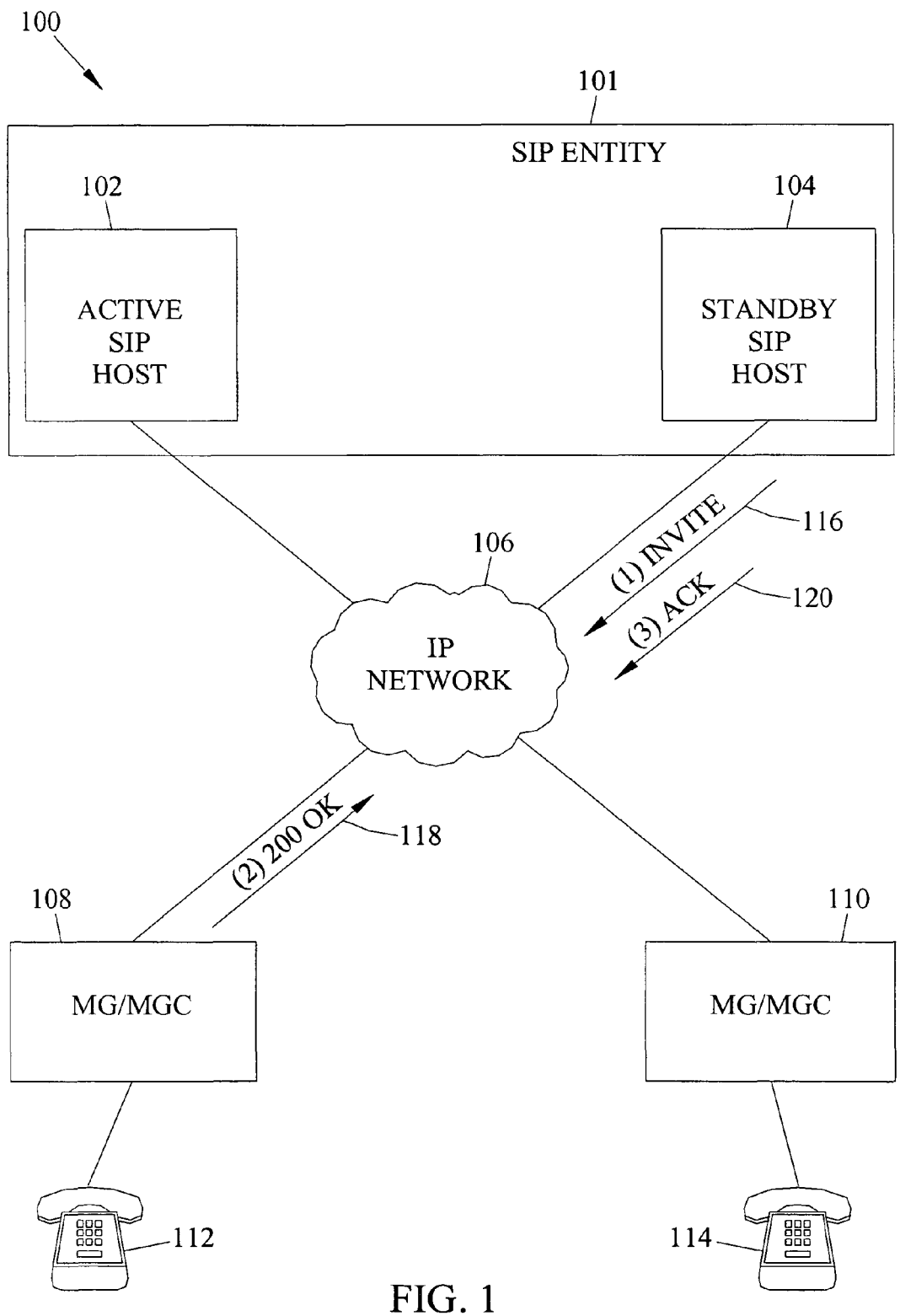
FIG. 1 is a block diagram of an exemplary telecommunications subsystem.
Figure 2:
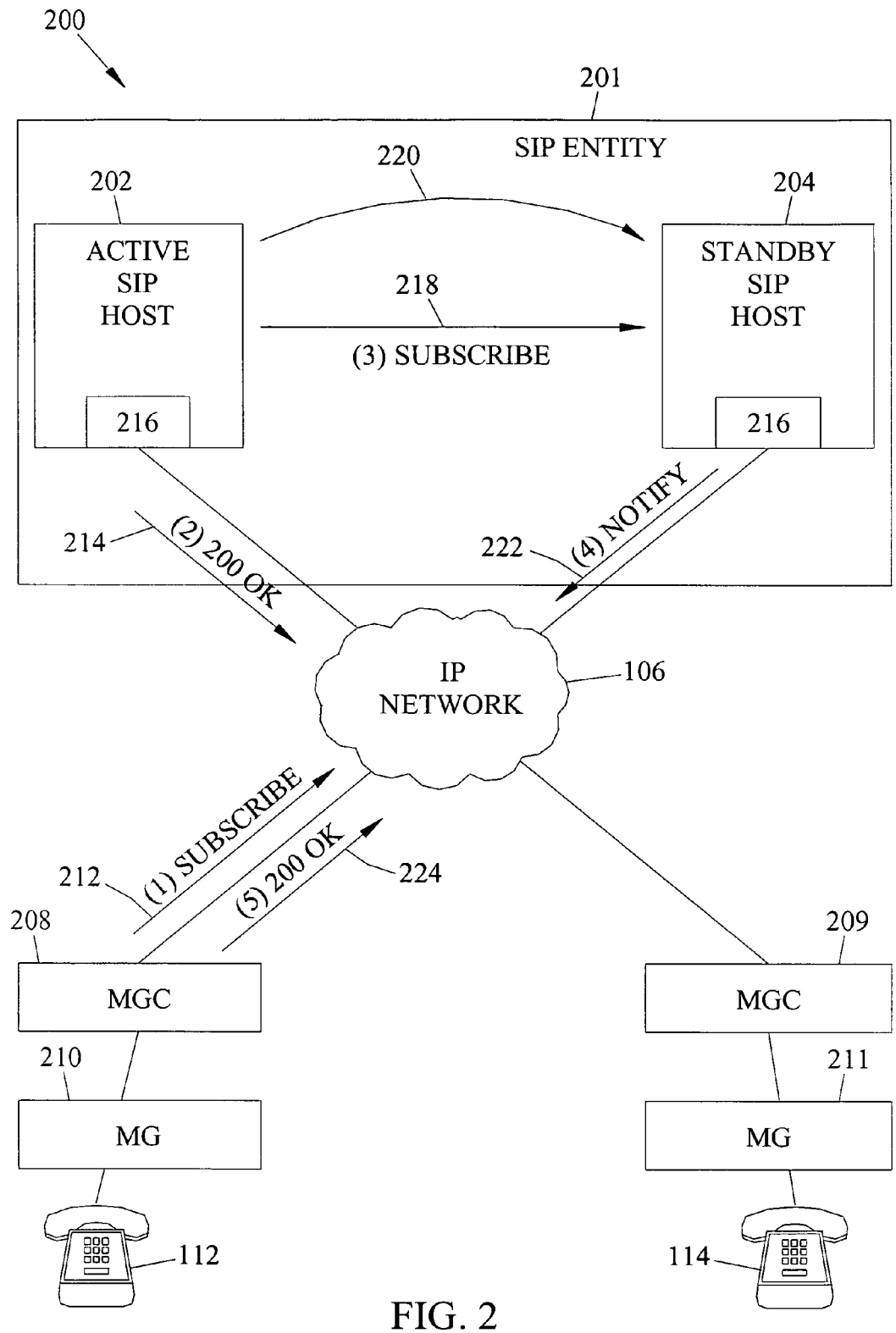
FIG. 2 is a block diagram of a system for subscription-based switchover between active and standby SIP hosts according to an embodiment of the subject matter described herein.

FIG. 2 shows an exemplary telecommunications subsystem 200. Within telecommunications subsystem 200 is IP network 106, a SIP entity 201 having an active SIP host 202 and a standby SIP host 204, media gateway controllers 208 and 209, media gateways 210 and 211, and subscriber terminals 112 and 114. Active SIP host 202 and standby SIP host 204 may implement a SIP protocol function. For example, active SIP host 202 and standby SIP host 204 may each implement a SIP proxy server, redirect server, user agent, or other SIP protocol function.

Media gateway controllers 208 and 209 may also include SIP functionality. For example, media gateway controllers 208 and 209 may implement SIP proxy server, redirect server, and/or user agent functionality. Media gateways 210 and 211 may control media stream connections to and from subscriber terminals 112 and 114. An exemplary commercially available media gateway/media gateway controller architecture suitable for implementing components 208 through 211 illustrated in FIG. 2 is the T9000 architecture available from Tekelec of Morrisville, N.C. An exemplary commercially available system on which active and standby SIP host 202 and 204 may be implemented is the T3000 platform also available from Tekelec of Morrisville, N.C.

Media gateway controllers 208 and 209 are each capable of subscribing to a notification mechanism by which active SIP host 202 and standby SIP host 204 provide notification to MGCs 208 and 209 in the event of a switchover from active SIP host 202 to standby SIP host 204.

One exemplary SIP fast switchover (SIP FS) notification process of telecommunications subsystem 200 may be initiated by MGC 208 sending a SUBSCRIBE message 212 to active SIP host 202. SUBSCRIBE message 212 includes information identifying MGC 208, including the internet protocol (IP) address of MGC 208, so that MGC 208 can be notified in the event of a switchover from active SIP host 202 to standby SIP host 204. Active SIP host 202 responds to the SUBSCRIBE message 212 with an acknowledgement (200 OK) 214 message to MGC 208. Alternatively, active SIP host 202 could respond to SUBSCRIBE message 212 with a reject message or a 503 (not allowed) message. These are not depicted in FIG. 2.

Active SIP host 202 and standby SIP host 204 may have a storage medium 216 for storing information related to subscribed MGCs. This information includes the IP address of subscribed MGCs. Upon receipt of SUBSCRIBE message 212, active SIP host 202 may create an entry using the information included within SUBSCRIBE message 212 in storage medium 216. This entry can be used to identify MGC 208 as being subscribed to a SIP FS notification mechanism. Active SIP host 202 may then send SUBSCRIBE message 212 to standby SIP host 204 as SUBSCRIBE message 218. Though not depicted in the drawing, standby SIP host 204 can respond to SUBSCRIBE message 218 with a 200 OK message or can respond by some other mechanism available for verifying proper delivery of the message.

Upon receipt of SUBSCRIBE message 218 at standby SIP host 204, standby SIP host 204 can create an entry in its storage medium 216 with the information included in the message that is related to and identifies MGC 208 as an entity subscribed to the SIP FS notification mechanism.

The SIP FS notification mechanism may activate in response to a switchover from an active SIP host 202 to a standby SIP host 204. A switchover event 220 may occur for a variety of reasons, for example, failure of active SIP host 202, maintenance of active SIP host 202, updated provisioning for active SIP host 202 or a variety of other reasons. Switchover, as disclosed herein, may also be used for many other purposes, for example, load balancing where dialogs that are active on one host may be moved to another host to balance the load between the hosts. Accordingly, all such other purposes are considered within the scope of this disclosure.

A switchover event 220 may be triggered in a variety of ways. For example, in relation to any possible switchover event performed for reasons other than a failure of an active SIP host, some of which were discussed above, an internal message from active SIP host 202 to standby SIP host 204 may be used to activate standby SIP host 204. Other mechanisms for activating standby SIP host 204 are possible, such as, for example, a power fail interrupt or other alert mechanism that may notify a standby SIP host that an active SIP host has failed. Accordingly, all such mechanisms for activating a standby SIP host are considered within the scope of this disclosure.

Further, security measures may be used to prevent a host from switching over to either a valid or an invalid standby host. For example, encryption of an internal message, such as the internal message discussed above, may be used to validate that a switchover event is genuine. Many other security measures are possible to avoid an unintended switchover by an active SIP host to either a valid or an invalid standby host and all are considered within the scope of this disclosure.

When a standby SIP host 204 becomes an active SIP host by entering an active mode, it can associate with a new standby SIP host (not shown in FIG. 2). As will be described in more detail below, standby SIP host 204 can then send a NOTIFY message 222 to each MGC 208 that is subscribed to the SIP FS notification mechanism. SIP host 204 can also send a SUBSCRIBE message 218 to the new standby SIP host for each subscribed MGC as described above. In this way, subscription information can be propagated from activated standby SIP hosts to new standby SIP hosts over time without a need for MGCs to re-subscribe to the notification process. In an alternative embodiment, SIP host 204 could send a single bulk SUBSCRIBE message including information associated with all subscribed MGCs to the new standby SIP host. A bulk SUBSCRIBE messaging scheme for updating a new standby SIP host would further reduce network traffic for a switchover event. For non-failure related switchover events where active SIP host 202 may perform messaging activities, either or both of SIP host 202 and standby SIP host 204 may be configured to send NOTIFY message 222.

NOTIFY message 222 may include information identifying a new active SIP host (e.g., the standby SIP host 204 which has now switched to an active mode), a new standby SIP host (not shown in FIG. 2) within the network, and the Internet protocol (IP) address of both the new active SIP host and the IP address of the new standby SIP host. MGC 208 can then update its local records with the information included in NOTIFY message 222. MGC 208 may also then update all of its dialog records with the IP address of standby SIP host 204 to indicate that it is now the active SIP host.

Upon update of each dialog within MGC 208 with the IP address for standby SIP host 204, all dialogs associated with MGC 208 can then operate without a need for standby SIP host 204 to individually invite each dialog to transition to standby SIP host 204. This can quickly and efficiently be done within MGC 208 without a need for further network traffic or the latency associated with such traffic.

It is believed that this method will greatly reduce network traffic associated with a switchover event and provide better call retention than previous methods. For example, rather than requiring an INVITE message to be sent to a SIP peer for each dialog, a SUBSCRIBE message, a NOTIFY message and assorted 200 OK messages can be used to update all dialogs maintained by the SIP peer. It is believed that this reduction in network message overhead can reduce and prevent dropped calls by removing the message latency associated with individual notification to each dialog. By allowing a quicker transition to standby SIP host 204, dialogs that would otherwise not have been able to communicate with any SIP host during a switchover period may now communicate sooner and have a higher probability of remaining active.

Beyond the network message latency reductions, there are also many approaches to quickly update the information within MGC 208 that can allow for a very rapid update of active host information associated with the dialogs. All should be considered within the spirit and scope of this specification. For example, direct memory access (DMA), register pointer based accessing whereby all dialogs read the same memory location for the IP address of the active host and whereby transitions to new register-based data can occur in as little as a single clock cycle, and many other approaches can be used to allow rapid updating of the active host information for all active dialogs. Those skilled in the art will recognize many other suitable memory updating schemes and all are considered within the scope and spirit of this specification.

Figure 3A:
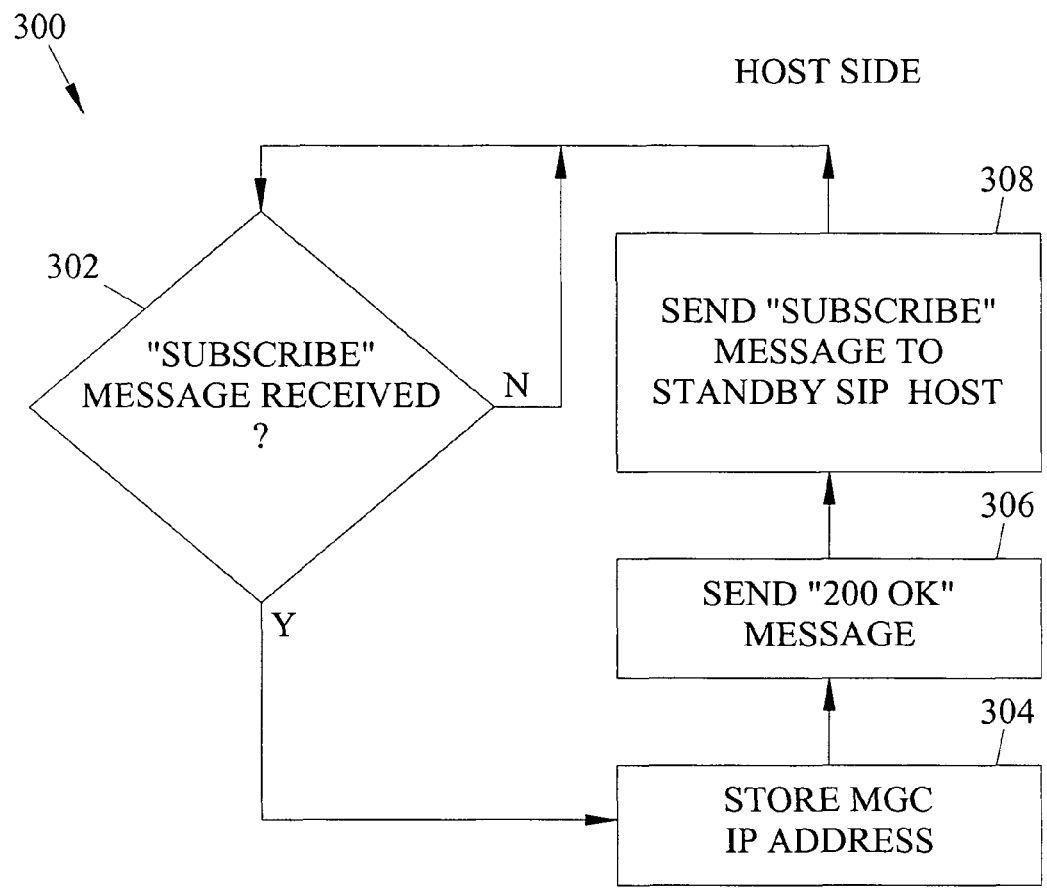
FIG. 3A is a flow chart of an active host entity subscription process according to an embodiment of the subject matter described herein.
Figure 3B:
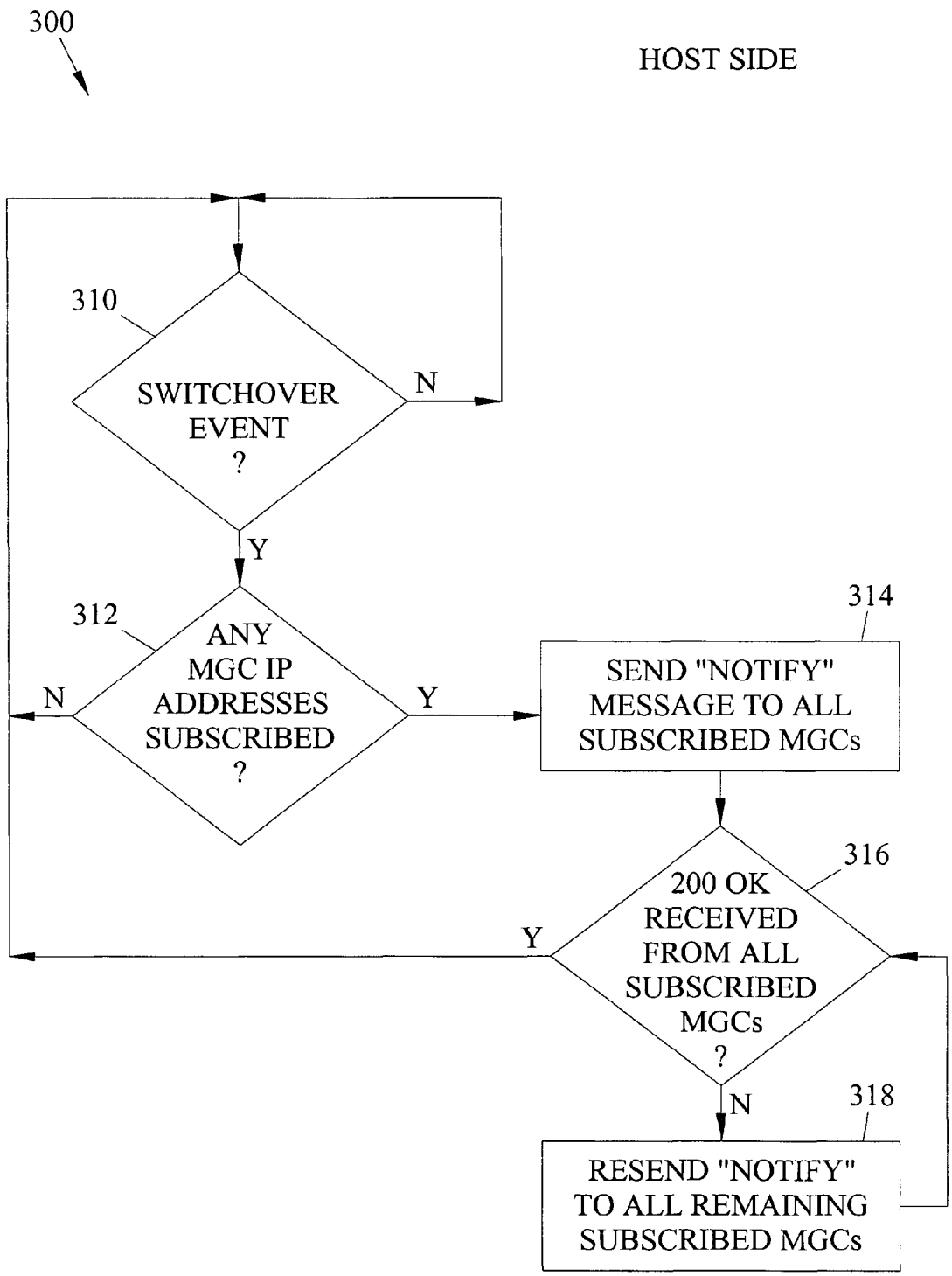
FIG. 3B is a flow chart of an active host entity notification process according to an embodiment of the subject matter described herein.

FIGS. 3A and 3B represent portions of an exemplary SIP FS process 300 resident on active SIP host 202 and standby SIP host 204. This process is divided into two flow charts for ease of description. The process begins in FIG. 3A at 302 where a SIP host will wait for a SUBSCRIBE message from an MGC 208 that includes identifying information for MGC 208. If a SUBSCRIBE message is received, the process transitions to 304. At 304, process 300 can store the identifying information, for example the IP address, of the MGC that is attempting to subscribe to the notification mechanism. A transition can be made to 306 where an acknowledgment message (200 OK) is formed and sent to the subscribing MGC. The SUBSCRIBE message can also be forwarded at 308 to the current standby SIP host with the information identifying the subscribing MGC. A transition can then be made to 302 to await future events.

FIG. 3B shows a portion of SIP FS process 300 related to handling a switchover event. This portion of SIP FS process 300 begins at 310 where the process waits for a switchover event. If a switchover event occurs, a transition can be made to 312 where the process determines whether any MGCs are currently subscribed to the notification mechanism. If there are no MGCs currently subscribed, process 300 transitions to 310 to await another switchover event. However, if there are any MGCs currently subscribed to the notification mechanism, a transition can be made to 314 where process 300 can associate with a new standby SIP server as discussed above and a NOTIFY message can be formed.

The NOTIFY message can include information indicating the new active server, new standby server, and the IP addresses of both. This NOTIFY message can then be sent to all subscribed MGCs. A transition can then be made to 316 where the process checks for 200 OK responses from all subscribed MGCs. If any MGC has not responded after a defined timeout period, a transition can be made to 318 to resend the NOTIFY message to the remaining MGCs. This continues until either all have responded or a sufficient time passes such that error handling should be invoked. The error handling is not discussed herein, but a variety of mechanisms can be used to handle errors of this sort, any of which are considered to be within the scope and spirit of this disclosure. In order to simplify this discussion, a reliable messaging mechanism is considered such that all MGCs respond and a transition can then be made back to 310 to process future events.

Figure 4A:
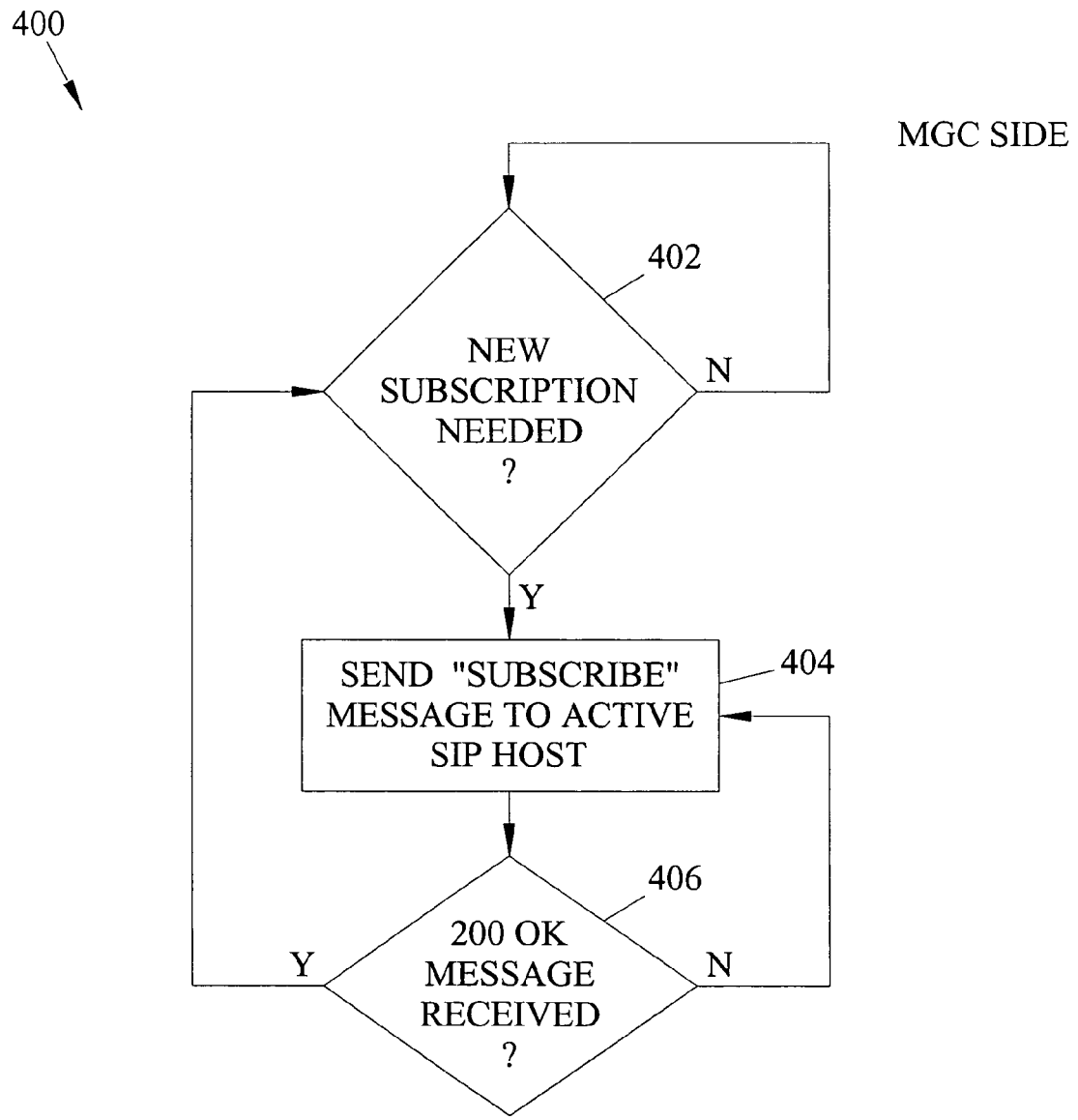
FIG. 4A is a flow chart of an MGC subscription process according to an embodiment of the subject matter described herein.
Figure 4B:
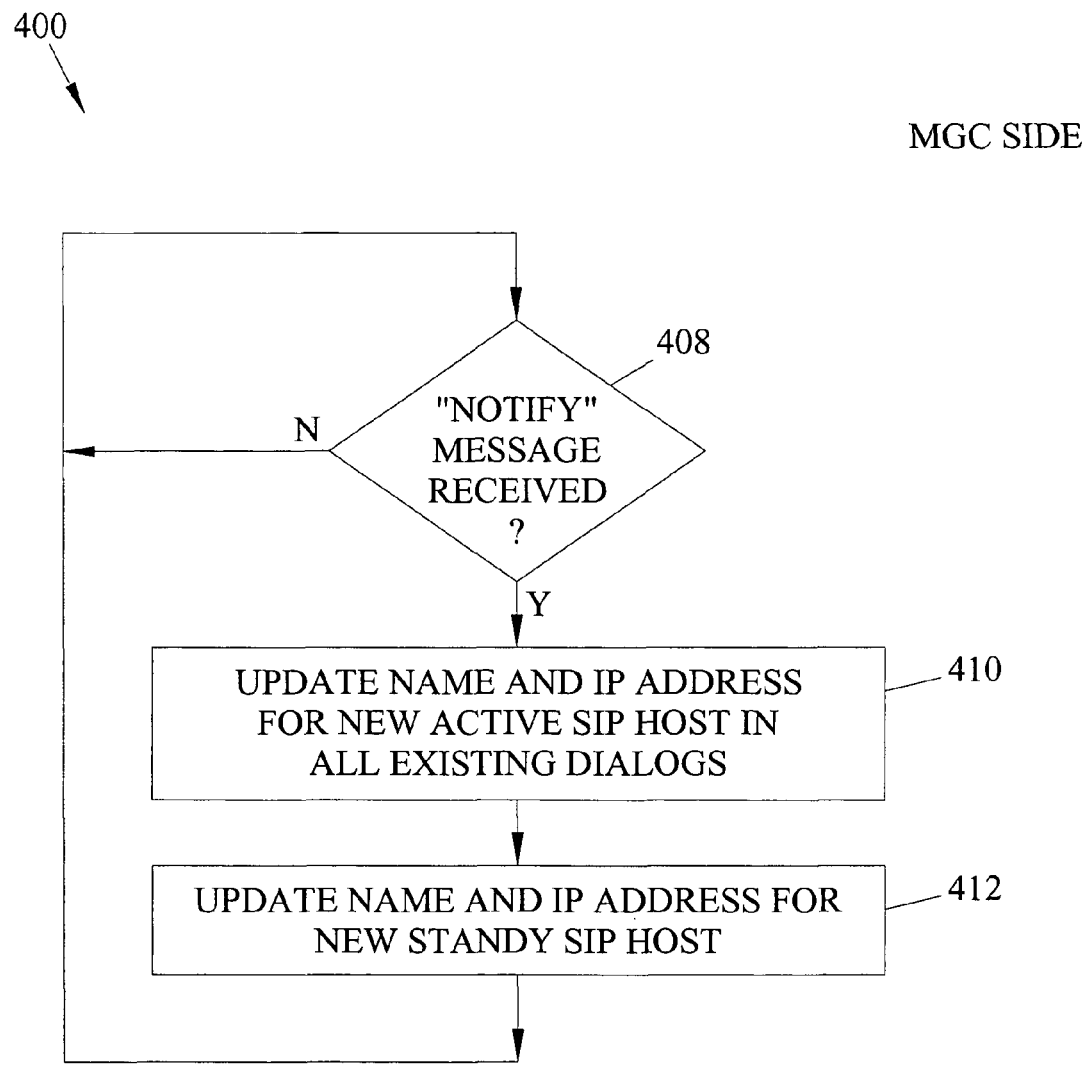
FIG. 4B is a flow chart of an MGC notification process according to an embodiment of the subject matter described herein.

FIGS. 4A and 4B show the MGC side of an exemplary SIP FS process 400. This process is divided into two flow charts for ease of description. SIP FS process 400 begins in FIG. 4A at 402 where the MGC determines whether a subscription message needs to be sent to an active SIP host. This determination could occur based upon a variety of circumstances, some of which are detailed herein. For example, a new subscription may be required upon a boot of an MGC with new code or during any provisioning event for the MGC, when a new active SIP host is provisioned or comes back online after maintenance that results in a break in the subscription forwarding discussed above, and upon any other system event that could require a new SUBSCRIBE message to be sent.

Another example of a situation where a new SUBSCRIBE message may need to be sent is for a case where a new feature is deployed in an active SIP host and a standby SIP host, and the NOTIFY message instructs the MGC to perform a function or forward additional information related to the subscription mechanism. In this way, the subscription process can be modified without a need for extensive outage of the MGC. Many mechanisms exist for the deployment of new services and features within communications networks. These are not detailed herein, but all are considered within the scope and spirit of this disclosure.

If a new SUBSCRIBE is needed, process 400 transitions to 404. At 404, MGC 208 sends a SUBSCRIBE message to its presently active SIP host. A transition is then made to 406 where the MGC awaits an acknowledgement (200 OK) message from the active SIP host. If the active SIP host does not acknowledge the SUBSCRIBE request within a defined timeout period, a transition is made back to 404 where a new SUBSCRIBE message is sent, and a transition is made back to 406 to await an acknowledgment (200 OK) from the active SIP host.

The re-sending of the SUBSCRIBE message may continue until either the active SIP host has responded or a sufficient time passes such that error handling should be invoked. The error handling is not discussed herein, but a variety of mechanisms can be used to handle errors of this sort, any of which are considered to be within the scope and spirit of this disclosure. In order to simplify this discussion, a reliable messaging mechanism is considered such that the active SIP host can respond and a transition can then be made back to 402 to determine whether any new SUBSCRIBE messages need to be sent as discussed above.

FIG. 4B shows a portion of SIP FS process 400 related to handling a NOTIFY message. This portion of SIP FS process 400 begins at 408 where the process waits for a NOTIFY message from a newly activated standby SIP host that is to become the new active SIP host. A NOTIFY message will contain information related to updating dialogs that are associated with the MGC to associate the dialogs with the new active SIP host. This information can include the name and IP address of the new active SIP host and a new standby SIP host.

When a NOTIFY message is received, a transition can be made to 410 where the NOTIFY message is parsed to extract the information, which can include the name and IP address for a new active host and a new standby host. The IP address of the new active host can be updated for each existing dialog presently associated with the MGC as discussed above. At 412, the new standby host name and IP address can be updated and a transition can be made back to 408 to wait for a NOTIFY message.

The steps described above that include waiting for a message can be implemented using any of a variety of mechanisms. For example, an interrupt mechanism, a polling mechanism and many other mechanisms are available. Accordingly, all are considered within the scope and spirit of this disclosure.

It will be understood that various details of the invention may be changed without departing from the scope of the invention. Furthermore, the foregoing description is for the purpose of illustration only, and not for the purpose of limitation, as the subject matter described herein is defined by the claims as set forth hereinafter.

What is claimed is:

1. A method for notifying a Session Initiation Protocol (SIP) entity of a fast switchover event, the method comprising:
   (a) providing a first SIP entity having an active host and a standby host, where the active host is associated with plural dialogs maintained at a second SIP entity, wherein the second SIP entity comprises at least one of a media gateway controller (MGC) and a media gateway (MG);
   (b) receiving, at the active host, a SUBSCRIBE message from the second SIP entity for subscribing to a fast switchover notification service;
   (c) switching the standby host to an active mode, wherein switching the standby host to the active mode includes switching the standby host to the active mode in response to one of failure of the active host, a maintenance activity on the active host, and a provisioning update activity on the active host; and
   (d) in response to switching the standby host to active mode, sending a NOTIFY message to the second SIP entity for notifying the second SIP entity that the standby host is operating in active mode, wherein, in response to the NOTIFY message, the second SIP entity updates the dialogs with information included in the NOTIFY message to associate the dialogs with the standby host that has been switched to the active mode and thereby avoids individual messaging for each dialog to associate each dialog with the standby host.

2. The method of claim 1 wherein the SUBSCRIBE message includes information identifying the second SIP entity.

3. The method of claim 2 wherein the information identifying the second SIP entity includes an Internet Protocol (IP) address for the second SIP entity.

4. The method of claim 1, comprising, in response to receiving the SUBSCRIBE message at the active host, responding to the second SIP entity with a 200 OK message.

5. The method of claim 1, comprising, in response to receiving the SUBSCRIBE message at the active host, sending the SUBSCRIBE message to the standby host.

6. The method of claim 5 wherein the SUBSCRIBE message includes information identifying the second SIP entity.

7. The method of claim 6 wherein the information identifying the second SIP entity includes the Internet Protocol (IP) address of the second SIP entity.

8. The method of claim 1, comprising, sending the NOTIFY message from the standby host that has been switched to the active mode.

9. The method of claim 8 wherein the NOTIFY message includes information identifying the standby host that has been switched to the active mode.

10. The method of claim 9 wherein the information identifying the standby host that has been switched to the active mode includes an Internet Protocol (IP) address of the standby host that has been switched to the active mode.

11. The method of claim 1 wherein the NOTIFY message includes information identifying a new standby host.

12. The method of claim 11 wherein the information identifying the new standby host includes an Internet Protocol (IP) address of the new standby host.

13. The method of claim 1, comprising, in response to sending the NOTIFY message, receiving a 200 OK message from the second SIP entity.

14. A method for updating Session Initiation Protocol (SIP) dialogs associated with a SIP server to perform a fast switchover event, the method comprising:
   (a) maintaining, at a first SIP entity, a plurality of SIP dialogs associated with a second SIP entity having an active host and a standby host, wherein the first SIP entity comprises at least one of a media gateway controller (MGC) and a media gateway (MG);
   (b) sending, from the first SIP entity to the active host, a SUBSCRIBE message for subscribing to a fast switchover notification service;
   (c) receiving a NOTIFY message indicating a switch of the standby host to an active mode, wherein switching the standby host to the active mode includes switching the standby host to the active mode in response to one of failure of the active host, a maintenance activity on the active host, and a provisioning update activity on the active host; and
   (d) in response to receiving the NOTIFY message indicating the switch of the standby host to the active mode, updating the SIP dialogs with information included in the NOTIFY message to associate the SIP dialogs with the standby host that has been switched to the active mode and thereby avoid individual messaging for each of the dialogs to associate each of the dialogs with the standby host that has been switched to the active mode.

15. The method of claim 14 wherein the SUBSCRIBE message includes information identifying the first SIP entity.

16. The method of claim 15 wherein the information identifying the first SIP entity includes an Internet Protocol (IP) address for the first SIP entity.

17. The method of claim 16 comprising, in response to sending the SUBSCRIBE message to the active host, receiving a 200 OK message.

18. The method of claim 14 wherein receiving the NOTIFY message includes receiving the NOTIFY message in response to one of a failure of the active host, a maintenance activity on the active host, and a provisioning update activity on the active host.

19. The method of claim 14 wherein receiving the NOTIFY message includes receiving the NOTIFY message from the standby host that has been switched to the active mode.

20. The method of claim 14 wherein the NOTIFY message includes information identifying the standby host that has been switched to the active mode.

21. The method of claim 20 wherein the information identifying the standby host that has been switched to the active mode includes an Internet Protocol (IP) address of the standby host that has been switched to the active mode.

22. The method of claim 14 wherein the NOTIFY message includes information identifying a new standby host.

23. The method of claim 22 wherein the information identifying the new standby host includes an Internet Protocol (IP) address of the new standby host.

24. The method of claim 14 comprising, in response to receiving the NOTIFY message, sending a 200 OK message to the standby host that has been switched to the active mode.

25. A Session Initiation Protocol (SIP) System for notifying a SIP entity of a fast switchover event, the system comprising:
(a) an active SIP host of a first SIP entity that is associated with a plurality of SIP dialogs maintained at a second SIP entity, wherein the second SIP entity comprises at least one of a media gateway controller (MGC) and a media gateway (MG), wherein the active SIP host receives a SUBSCRIBE message from the second SIP entity for subscribing to a fast switchover notification service; and
(b) a standby SIP host of the first SIP entity that switches to an active mode in response to a switchover event, wherein switching the standby SIP host to the active mode includes switching the standby SIP host to the active mode in response to one of failure of the active SIP host, a maintenance activity on the active SIP host, and a provisioning update activity on the active SIP host, and wherein, in response to the switchover event, at least one of the active SIP host and the standby SIP host is adapted to send a NOTIFY message to the second SIP entity notifying the second SIP entity that the standby host has switched to the active mode, wherein, in response to the NOTIFY message, the second SIP entity updates the SIP dialogs with information included in the NOTIFY message to associate the SIP dialogs with the standby host that has been switched to the active mode and thereby avoids individual messaging for each dialog to associate each dialog with the standby SIP host.

26. The SIP System of claim 25 wherein the active host is adapted to, in response to receiving the SUBSCRIBE message, send the SUBSCRIBE message to the standby host.

27. The SIP System of claim 26, wherein the SUBSCRIBE message includes information identifying the SIP entity sending the SUBSCRIBE message.

28. The SIP System of claim 27, wherein the information identifying the SIP entity includes the Internet Protocol (IP) address of the SIP entity.

29. The SIP System of claim 25 wherein the switchover event includes one of a failure of the active host, a maintenance activity on the active host, and a provisioning update activity on the active host.

30. The SIP Host System of claim 25 wherein the NOTIFY message includes information identifying a new standby host.

31. The SIP System of claim 25 wherein the standby host that has been switched to the active mode is further adapted to, in response to sending the NOTIFY message, receive a 200 OK message from the SIP entity.

32. A system for performing Session Initiation Protocol (SIP) fast switchover, the system comprising:
(a) a first SIP entity including an active SIP host and a standby SIP host, wherein the active SIP host is associated with plural dialogs maintained at a second SIP entity, wherein the second SIP entity comprises at least one of a media gateway controller (MGC) and a media gateway (MG); and
(b) the second SIP entity for sending a message to the first SIP entity for subscribing to a switchover notification service, wherein, in response to a switchover event and the message, the first SIP entity is adapted to send a NOTIFY message to the second SIP entity notifying the second SIP entity that the standby SIP host has switched to an active mode, wherein switching the standby SIP host to the active mode includes switching the standby host to the active mode in response to one of failure of the active SIP host, a maintenance activity on the active SIP host, and a provisioning update activity on the active SIP host, and wherein, in response to the NOTIFY message, the second SIP entity updates the dialogs with information included in the NOTIFY message to associate the dialogs with the standby host that has been switched to the active mode and thereby avoids individual messaging for each of the dialogs to associate each of the dialogs with the standby host that has been switched to the active mode.

33. A computer program product comprising computer-executable instructions embodied in a non-transitory computer-readable medium for performing steps comprising:
(a) providing a first Session Initiation Protocol (SIP) entity having an active host and a standby host;
(b) receiving, at the active host, a SUBSCRIBE message from a second SIP entity for subscribing to a fast switchover notification service, wherein the second SIP entity maintains plural dialogs that are associated with the active host and wherein the second SIP entity comprises at least one of a media gateway controller (MGC) and a media gateway (MG);
(c) switching the standby host to an active mode, wherein switching the standby host to the active mode includes switching the standby host to the active mode in response to one of failure of the active host, a maintenance activity on the active host, and a provisioning update activity on the active host; and
(d) in response to switching the standby host to active mode, sending a NOTIFY message to the second SIP entity for notifying the second SIP entity that the standby host is operating in active mode, wherein, in response to the NOTIFY message, the second SIP entity updates the dialogs with information included in the NOTIFY message to associate the dialogs with the standby host that has been switched to the active mode and thereby avoids individual messaging for each dialog to associate each dialog with the standby host.

34. A computer program product comprising computer-executable instructions embodied in a non-transitory computer-readable medium for performing steps comprising:
(a) maintaining, at a first Session Initiation Protocol (SIP) entity, a plurality of SIP dialogs with a second SIP entity having an active host and a standby host, wherein the first SIP entity comprises at least one of a media gateway controller (MGC) and a media gateway (MG);
(b) sending, from the first SIP entity to the active host, a SUBSCRIBE message for subscribing to a fast switchover notification service;
(c) receiving a NOTIFY message indicating a switch of the standby host to an active mode, wherein switching the standby host to the active mode includes switching the standby host to the active mode in response to one of failure of the active host, a maintenance activity on the active host, and a provisioning update activity on the active host; and
(d) in response to receiving the NOTIFY message indicating the switch of the standby host to the active mode, updating the SIP dialogs with information included in the NOTIFY message to associate the SIP dialogs with the standby host that has been switched to the active mode and thereby avoids individual messaging for each of the dialogs to associate each of the dialogs with the standby host that has been switched to the active mode.

* * * * *